United States Patent
Ohashi

Patent Number: 5,581,319
Date of Patent: Dec. 3, 1996

[54] ILLUMINATING WINDOW TYPE BRIGHT FRAME FINDER

[75] Inventor: Kazuyasu Ohashi, Tokyo, Japan

[73] Assignee: Ricoh Company, Ltd., Tokyo, Japan

[21] Appl. No.: 420,506

[22] Filed: Apr. 12, 1995

[30] Foreign Application Priority Data

Apr. 13, 1994 [JP] Japan .................. 6-074682

[51] Int. Cl.$^6$ .................................. G03B 13/02
[52] U.S. Cl. .................. 396/374; 396/378; 396/385
[58] Field of Search ........................ 354/219, 224, 354/225; 359/41

[56] References Cited

U.S. PATENT DOCUMENTS

| | | | |
|---|---|---|---|
| 3,053,136 | 9/1962 | Ito et al. | 354/166 |
| 4,139,278 | 2/1979 | Matsumoto et al. | 354/94 |
| 4,140,378 | 2/1979 | Suzuki et al. | 354/472 |
| 4,348,091 | 9/1982 | Iizuka | 354/225 |
| 4,478,493 | 10/1984 | Yokota | 354/222 |
| 4,750,014 | 6/1988 | Frank | 354/471 |
| 4,952,956 | 8/1990 | Kikuchi | 354/224 |
| 4,957,356 | 9/1990 | Oizuni et al. | 354/224 |

FOREIGN PATENT DOCUMENTS 57-173824 10/1982 Japan .

Primary Examiner—Michael L. Gellner
Assistant Examiner—Eddie C. Lee
Attorney, Agent, or Firm—Oblon, Spivak, McClelland, Maier & Neustadt, P.C.

[57] ABSTRACT

An illuminating window type bright frame finder is provided which comprises an objective lens with a negative focal length, an eyepiece with a positive focal length, a liquid crystal frame, and a half mirror. An optical path from the liquid frame to the eyepiece is formed by positioning the half mirror between the objective lens and the eyepiece. It is possible to observe a visual field image superimposed upon a frame image formed through only the eyepiece. On the condition that an incident angle of light upon the half mirror is 45° and the wavelength of the light belongs to a visible light range, an average reflectance $R_p$ with respect to p-polarized light is $R_p<0.35$ and an average reflectance $R_s$ with respect to s-polarized light is $R_s>0.65$.

4 Claims, 5 Drawing Sheets

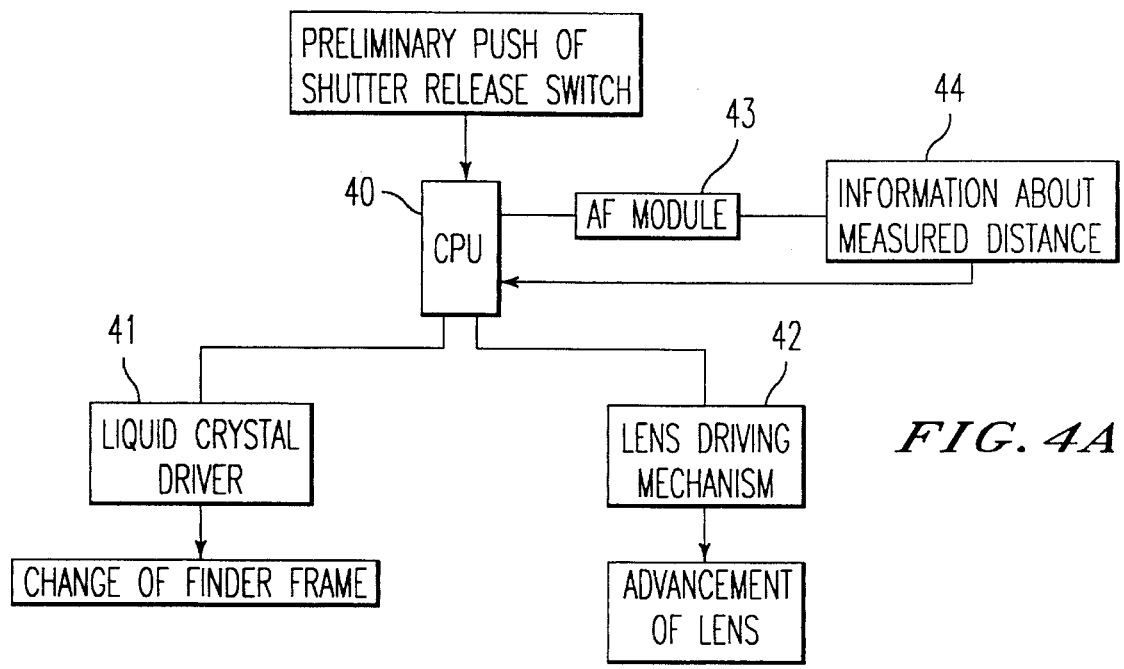
*FIG. 4A*
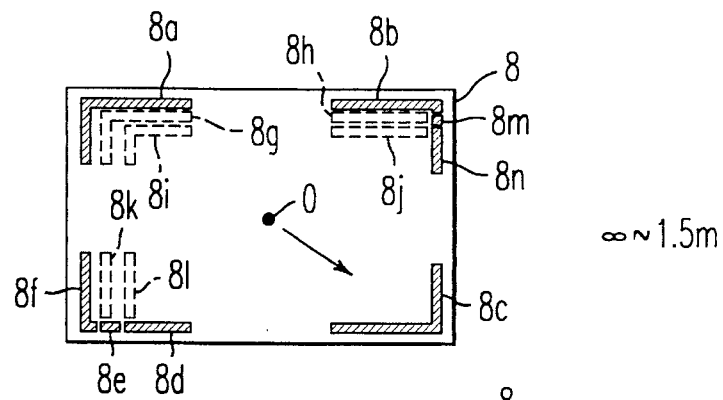
*FIG. 4B-1*  ∞~1.5m
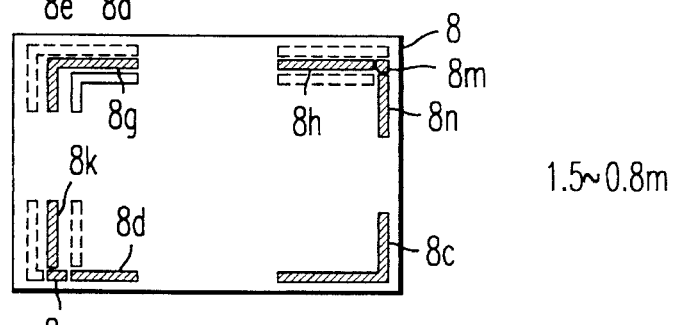
*FIG. 4B-2*  1.5~0.8m
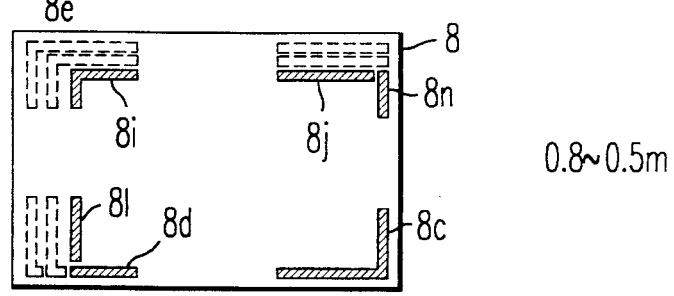
*FIG. 4B-3*  0.8~0.5m

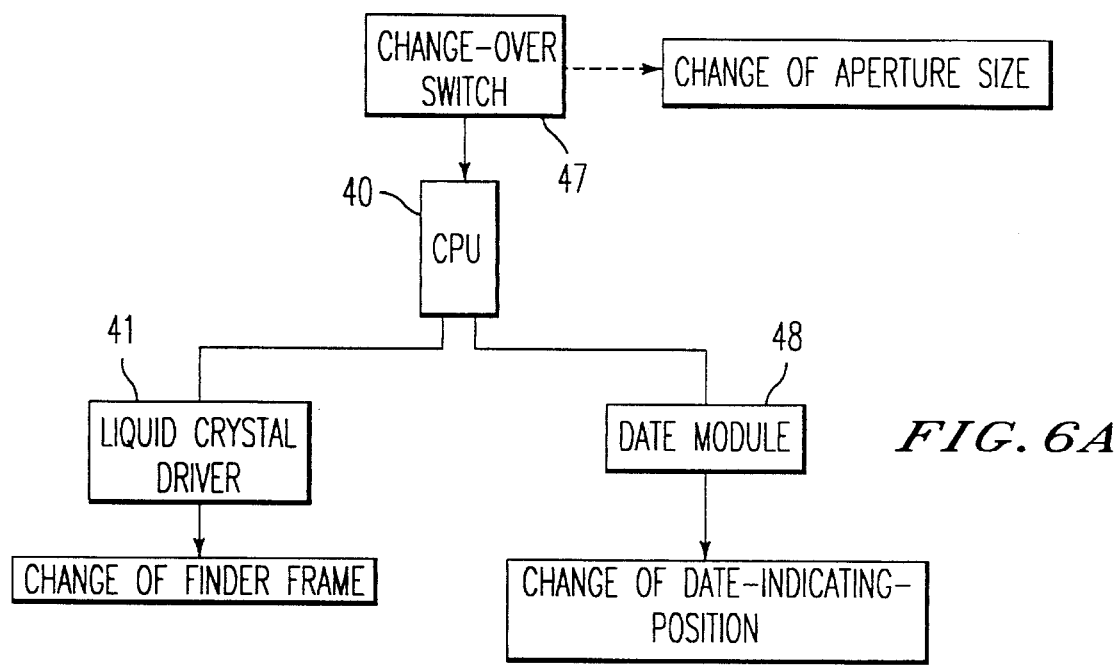
FIG. 6A
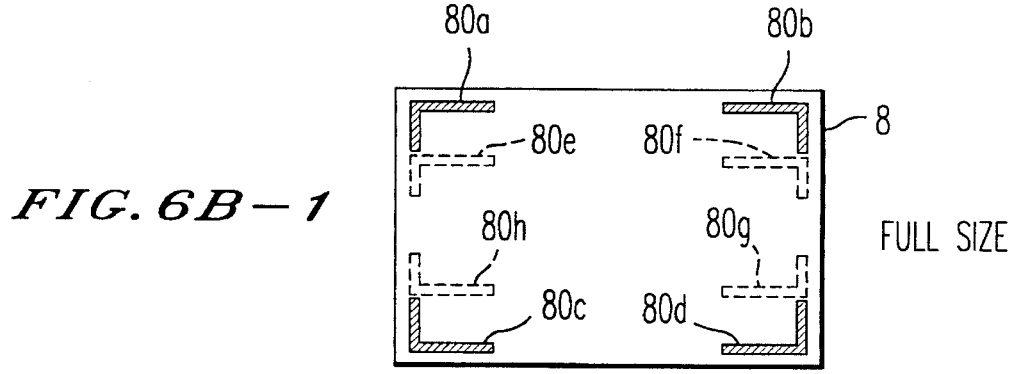
FIG. 6B-1    FULL SIZE
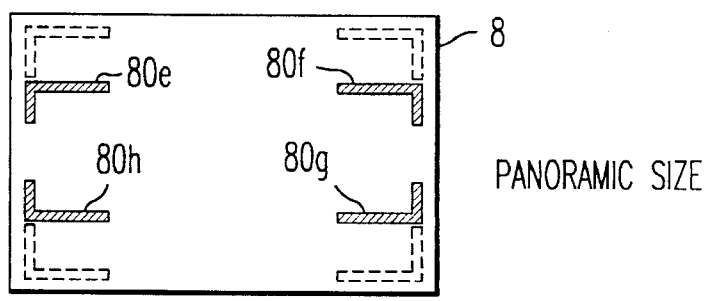
FIG. 6B-2    PANORAMIC SIZE

ILLUMINATING WINDOW TYPE BRIGHT FRAME FINDER

BACKGROUND OF THE INVENTION

1. Field of the Invention

The present invention relates to an illuminating window type bright frame finder. It is applicable to finders of, for example, a lens shutter camera and video camera.

2. Description of the Prior Art

Nowadays, in a lens shutter camera, it is predominant that a standard image size (24 mm×36 mm) and what is called a panoramic image size (13 mm×36 mm) are optionally interchangeable. In accordance with this, a finder is prevailingly used in which an image of a visual field is interchangeable with another. Further, it is greatly required that a parallax between a photographic lens and a finder, which is unavoidable in the lens shutter camera, is automatically compensated by changing field images of the finder. An illuminating window type bright frame finder with a liquid crystal frame is proposed which is capable of changing field images without a complex mechanism (see Japanese Patent Application Early Laid-open Publication No. Sho 57-173824, for example). The liquid crystal frame has a twist nematic type of liquid crystal layer. The liquid crystal layer is placed between transparent electrode patterns determined according to the shape and position of the frame to be changed. A pair of polarizing plates are disposed before and after the liquid crystal layer. Directions of polarization of the polarizing plates are perpendicular to each other.

Light from a subject side passes through one of the two polarizing plates and the liquid crystal layer and then reaches the other one of the polarizing plates. If voltage is not applied to the liquid crystal layer, light which has passed through one of the polarizing plates becomes linearly polarized light and then strikes the other polarizing plate without changing the state of linearly polarized light. Accordingly, the linearly polarized light cannot pass through the other polarizing plate. On the other hand, if voltage is applied thereto, the direction of polarization of linearly polarized light made by passing through one of them is deflected 90° when the linearly polarized light passes through the liquid crystal layer. As a result, the direction of the light which has passed through the liquid crystal layer is made parallel with the direction of polarization determined by the other polarizing plate. Accordingly, the linearly polarized light can pass through the other polarizing plate.

In other words, if, according to the shape of the frame, voltage is applied to the liquid crystal layer, light which has passed through one of the polarizing plates can pass through the other one through the liquid crystal layer and therefore the shape and position of the frame can be discerned. Therefore, the changing of patterns of transparent electrodes to which voltage is applied leads to the changing of the shape and position of the frame.

However, in the liquid crystal frame, polarization characteristics of a pair of polarizing plates are used in order to transmit or intercept light, and for this reason, if the total quantity of light striking one of the polarizing plates is 1, the quantity of light emitted from the other one of the polarizing plates is 0.5. That is, the quantity of light passing through the liquid crystal frame is 50 percent of the quantity of light striking the same. In practice, the quantity of light passing through the liquid crystal frame is less than 50 percent because of, for example, the absorption of the light by the polarizing plates and liquid crystal layer, but this is ignored for the convenience of description. In addition, in the illuminating window type bright frame finder, light which has passed through the liquid crystal frame is gathered into an optical path of a finder system by means of a half mirror, and as a result, only part of the light which has passed therethrough enters an eyepiece. Accordingly, in the conventional illuminating window type bright frame finder, there is a problem in that a frame image within a visual field is dark and cannot be clearly viewed because of low efficiency in use of light.

In order to solve the problem, an arrangement has been proposed in which light is obtained from the upper side of a camera body (Magazine: Photographic Industry, Mar. 1994, infra page 62). However, it is not necessarily possible to always carry out sufficient lighting from the upper side thereof. For this reason, it is impossible to say that the problem mentioned above has been completely solved.

Further, under the present situation of the industrial field in which a lens shutter camera small in size is promoted, it is preferable to make a finder itself compact.

It is therefore a first object of the present invention to provide an illuminating window type bright frame finder capable of obtaining bright frame images and bright visual field images of the finder even if a liquid crystal frame is adopted. It is a second object of the present invention to provide a compact illuminating window type bright frame finder.

SUMMARY OF THE INVENTION

To achieve the objects, the illuminating window type bright frame finder according to the present invention comprises an objective lens, an eyepiece, a half mirror, a mirror, a liquid crystal frame, and a control means. The objective lens and eyepiece make up a finder-field-image observing system. That is, a virtual image of a subject formed by the objective lens with a negative focal length is observed through the eyepiece with a positive focal length. The half mirror is disposed between the objective lens and the eyepiece. Visual field images of the finder are formed as virtual images by light which has passed through the objective lens and the half mirror. According to the shape of the frame, the liquid crystal frame transmits light. The control means serves to control the liquid crystal frame. The mirror deflects light emitted from the liquid crystal frame to the half mirror, The mirror and the half mirror make up an optical path ranging from the liquid crystal frame to the eyepiece. That is, the optical path of the liquid crystal frame is joined to an optical path ranging from the objective lens to the eyepiece by means of the mirror and half mirror.

The combination of the objective lens, half mirror, and eyepiece makes up a finder system. The combination of the liquid crystal frame, mirror, half mirror, and eyepiece makes up a frame system. The finder system is of an inverted Galilean type.

Since the frame system is made up of the liquid crystal frame, mirror, half mirror, and eyepiece, its frame image is a virtual image formed by means of the eyepiece only and can be observed in the state in which the frame image is superimposed upon a field image formed by the finder system.

The illuminating window bright type frame finder according to one aspect of the present invention is characterized in that the half mirror has polarization characteristics in the above arrangement. On condition that an incident angle of light upon the half mirror is 45° and the light belongs to a visible range, the polarization characteristics of the half mirror are $R_p<0.35$ in average reflectance $R_p$ with respect to p-polarized light and $R_s>0.65$ in average reflectance $R_s$ with respect to s-polarized light. The half mirror may be constructed in such a way that a half mirror layer is placed between transparent parallel plates or is deposited on one of the plates. Further, the half mirror may consist of a junction prism in which prisms are united to each other with the half mirror layer between. In this case, the mirror of the frame system may be formed as a prism surface of the junction prism. If so, the mirror and half mirror can be arranged integrally. The mirror formed as the prism surface may make use of total reflection by means of the prism surface, or instead, a reflection film may be formed on the prism surface. The liquid crystal frame may be disposed on the front or top of the camera body.

FIG. 1(a) shows one example of an optical arrangement of the illuminating window type bright frame finder according to the present invention. Reference numeral 1 is an objective lens with a negative focal length, reference numeral 2 is a half mirror, reference numeral 3 is an eyepiece with a positive focal length, reference numeral 4 is a liquid crystal frame, reference numeral 5 is a mirror, and reference numeral 6 is a surface of a pupil. A finder system comprises the objective lens 1, half mirror 2 and eyepiece 3. A field image of the finder can be observed through the finder system. The half mirror 2 is constructed of a half mirror layer deposited on a transparent parallel plate. A frame system comprises the liquid crystal frame 4, mirror 5, half mirror 2, and eyepiece 3. That is, light which has passed through the liquid crystal frame 4 is reflected by the mirror 5 and then strikes the half mirror 2. A light component reflected by the half mirror 2 enters the eyepiece 3.

As shown in FIG. 1(b), in the liquid crystal frame 4, a pair of polarizing plates 7 and 9 are disposed before and after a twist nematic type of liquid crystal layer 8. The liquid crystal frame 4 is inserted between transparent electrode patterns determined according to the shape and position of the frame to be changed. The directions of polarization of the two polarizing plates 7, 9 are perpendicular to each other. If voltage is applied to the liquid crystal layer 8 by means of the transparent electrode patterns, 50 percent light passes through the liquid crystal layer 4, according to the patterns. The light which has passed through the liquid crystal frame 4 is, as shown in FIG. 1(a), reflected by the mirror 5. For convenience of description, let it be supposed that 100 percent light is reflected by the mirror 5. The light reflected by the mirror 5 is reflected by the half mirror 2 and then enters the eyepiece 3.

If the reflectance and transmittance of the half mirror 2 are R and T(=1−R), respectively, a rate of light reaching the eyepiece 3 through the liquid crystal frame 4 is 0.5×R in the optical path of the frame system, and a rate of light reaching the eyepiece 3 through the objective lens 1 is T=1−R in the optical path of the finder system.

If, as in a normal half mirror, the reflectance R of the half mirror 2 is 50 percent, a rate of light reaching the eyepiece 3 is 25 percent in the frame system and 50 percent in the finder system. Therefore, a frame image becomes darker than a field image of the finder and cannot be clearly viewed. If the reflectance R is 66.7 percent (the transmittance T is 33.3 percent), a rate of light reaching the eyepiece 3 is 33.3 percent in both of the finder and frame systems. As a result, the frame image can be easily viewed, but the field image itself becomes too dark.

In contrast, according to the present invention, as shown in FIG. 1(c), a half mirror layer 10 of the half mirror 2 is provided with polarization characteristics. For convenience of description, let it be supposed that the half mirror layer 10 has polarization characteristics in which the layer 10 transmits 100 percent of p-polarized light and reflects 100 percent of s-polarized light. In addition, the polarizing plates 7, 9 are arranged such that light which has passed through the liquid crystal frame 4 completely (100 percent) becomes s-polarized light with respect to the half mirror layer 10 in direction of polarization. If so, in the frame system, 100 percent of light b, which is part of incident light B upon the liquid crystal frame 4 and has passed therethrough, reaches the eyepiece 3. However, since 50 percent of the incident light B is intercepted by the liquid crystal frame 4, a rate ((b/B)×100 percent) of light reaching the eyepiece 3 through the frame system is 50 percent of the light B. On the other hand, since light A striking the half mirror 2 from the objective lens 1 is in a state of natural polarization, light a of 50 percent of the light A enters the eyepiece 3. In other words, a rate ((a/A)×100 percent) of light reaching the eyepiece 3 through the finder system is 50 percent of the light A. Accordingly, a bright and clear frame image can be viewed without making a finder field image dark.

In the above, a description was given on the assumption that the half mirror layer 10 has polarization characteristics in which 100 percent of p-polarized light is transmitted and 100 percent of s-polarized light is reflected. However, this is an ideal case. Such polarization characteristics are not necessarily required in a wavelength range of visible light.

If, as in the present invention, polarization characteristics are given in which the average reflectance of visible light of an incident angle 45° is $R_p<0.35$ with respect to p-polarized light and $R_s>0.65$ with respect to s-polarized light, a rate of light reaching the eyepiece 3 is more than 32.5 percent about the frame system and less than 65 percent about the finder system. Accordingly, it is possible to practically make a frame image clear without darkening a field image.

FIG. 2 shows another example of an optical arrangement of the illuminating window type bright frame finder according to the present invention. For convenience, in FIG. 2, the same reference numerals are given to the same optical constituents as those shown in FIGS. 1(a) to 1(c).

A difference in arrangement between FIG. 2 and FIG. 1(a) is that the half mirror 2 of FIG. 1(a) is replaced with a junction prism 13 with a half-mirror layer 14 between. The use of the junction prism 13 serving as the the half mirror 2 enables an optical distance to be lengthened by a refractive index of the junction prism 13 even if a geometrical distance is shortened. Accordingly, a shortened distance between the objective lens 1 and the eyepiece 3 advantageously results in a compact finder.

FIG. 3 shows still another example of an optical arrangement of the illuminating window type bright frame finder according to the present invention. Reference numerals 11 and 12 are each a lens with a negative focal length. The lenses 11, 12 make up an objective lens. Reference numeral 20 is an eyepiece and reference numeral 17 indicates a position where a liquid crystal frame is disposed. In this variant example, the half mirror 2 is replaced with a junction prism which comprises a parallelogrammic prism 14' and a rectangular prism 13' which are united to each other with a half-mirror layer 15 between. A prism surface 16 serves as a mirror. The prism surface 16 is parallel to the half mirror layer 15 formed on a junction surface of the parallelogrammic prism 14'. In this example, the mirror is realized by total reflection of the prism surface 16 but, as occasion demands, a reflection film may be formed thereon.

The illuminating window type bright frame finder according to the present invention is of an inverted Galilean type, which comprises an objective lens with a negative focal length and an eyepiece with a positive focal length. A photographer can observe a frame image superimposed upon a visual field image by means of the half mirror disposed between the objective lens and the eyepiece.

In order to dispose the half mirror 2 between the objective lens 1 and the eyepiece 3, a condition is required that a distance between the objective lens 1 and the eyepiece 3 is longer than an effective size. The reason is that the half mirror layer 10 is disposed at an angle of 45° with respect to an optical axis. However, if a magnification is heightened (for example, more than 0.4 times) while a wide angle (for example, more than 60°) of an actual visual field is sustained, it is difficult to satisfy the above condition. A solution to the problem is that the half mirror layer is disposed in the junction prism. Thereby, the above condition can be satisfied in a state in which the incident height of light out of the optical axis is controlled and the wide angle of the actual visual field is sustained. In other words, since the effective size of the objective lens can be lessened, the magnification can be heightened while the wide angle (for example, more than 60°) of the actual visual field is sustained.

BRIEF DESCRIPTION OF THE DRAWINGS

FIGS. 4(a) to 4(b–3) are each a descriptive drawing of the changing of a finder frame according to an embodiment of the present invention.

FIGS. 6(a) to 6(b–2) are each a descriptive drawing of the changing of a finder frame according to another embodiment of the present invention.

DETAILED DESCRIPTION OF THE PREFERRED EMBODIMENTS

Embodiments of an illuminating window type bright frame finder according to the present invention will now be described hereinafter with reference to the attached drawings.

Figure 2:
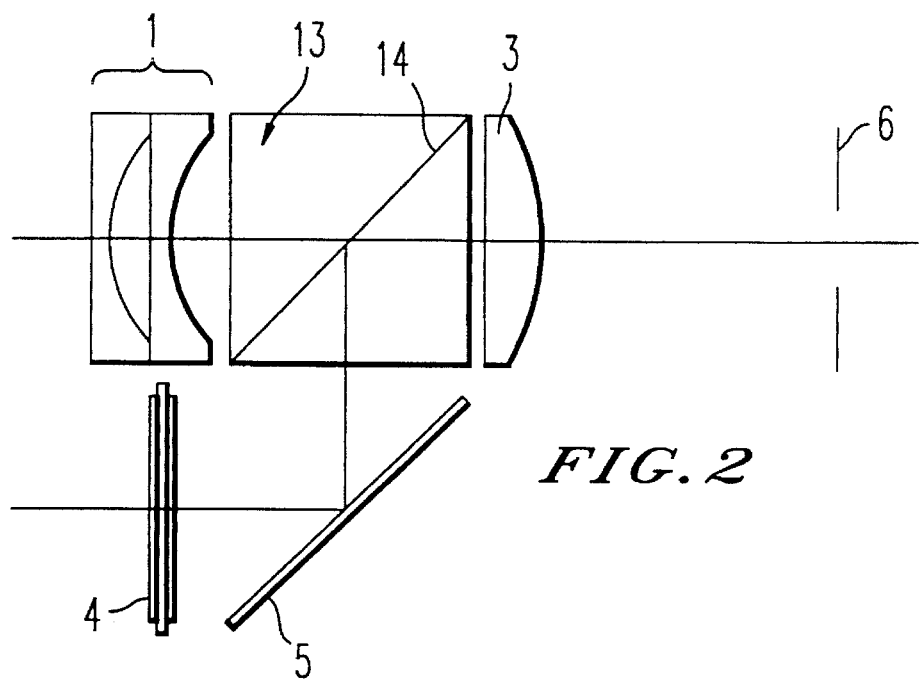
FIG. 2 shows an optical arrangement of the illuminating window type bright frame finder according to the present invention.

In the following embodiment, an optical arrangement shown in FIG. 2 is adopted.

An example of transparent electrode patterns of a liquid crystal layer 8 of a liquid crystal frame 4 shown in FIG. 2 is shown in FIGS. 4(b–1) to 4(b–3). As shown in FIG. 4(b–1), transparent electrodes 8a to 8n are formed on one side of the liquid crystal layer 8. On the other side thereof, a transparent electrode common to the transparent electrodes 8a to 8n is formed. The common transparent electrode may be formed on the whole surface of the other side of the liquid crystal layer 8.

FIG. 4(a) is a block diagram of a means for compensating a parallax of the liquid crystal frame 4 caused by changing a photographing distance. When a shutter-release-switch is preliminarily pushed, a CPU 40 performs auto-focus control by means of an auto-focus module 43 to obtain information about a measured distance. The CPU 40 selects a photographing distance from the respective ranges of ∞~1.5 m (long distance), 1.5~0.8 m (middle distance), and 0.8~0.5 m (short distance). The CPU 40 controls a lens driving device 42 to move a photographic lens to a focal point fixed according to the photographing distance. At the same time, according to the photographing distance, the CPU 40 controls a liquid crystal driver 41 to change a finder frame. That is, the CPU 40 and the liquid crystal driver 41 make up a control means for controlling the liquid crystal frame. When the photographing distance belongs to the long distance range, voltage is applied between the common transparent electrode and the transparent electrodes 8a, 8b, 8c, 8d, 8e, 8f, 8m, and 8n, as shown in FIG. 4(b–1). Thereby, the frame largest in size is obtained as shown in FIG. 4(b–1). When the photographing distance belongs to the middle distance range, voltage is applied between the common transparent electrode and the transparent electrodes 8g, 8h, 8m, 8n, 8c, 8d, 8e, and 8k, as shown in FIG. 4(b–2). When the photographing distance belongs to the short distance range, voltage is applied between the common transparent electrode and the transparent electrodes 8i, 8j, 8n, 8c, 8d, and 8l, as shown in FIG. 4(b–3). As the photographing distance becomes shorter, the shape of the frame becomes smaller. At the same time, the center of the frame moves from the center O of the liquid crystal layer 8 shown in FIG. 4(b–1) in the direction of the right-bottom corner of the layer 8. An optical axis of the photographing lens exists in the direction in which the center of the frame moves.

The constructive expression of the junction prism 13 shown in FIG. 2 is represented as G|H(LH)6|G. In this constructive expression, reference character G designates glass material of the prism. The refractive index of the prism is 1.743 here. Reference character H designates a high-refractive-index film of TiO$_2$ (refractive index 2.3, film thickness λe/4, and λ0=760 nm). Reference character L designates a low-refractive-index film of SiO$_2$ (refractive index 1.46, film thickness λe/4, λ0=760 nm). The number of thin film layers, each of which consists of the high-refractive-index film (H) and low-refractive-index film (L), is thirteen. Reference characters H and L are disposed alternately, and reference characters of first and 13th layers are each H.

Figure 5:
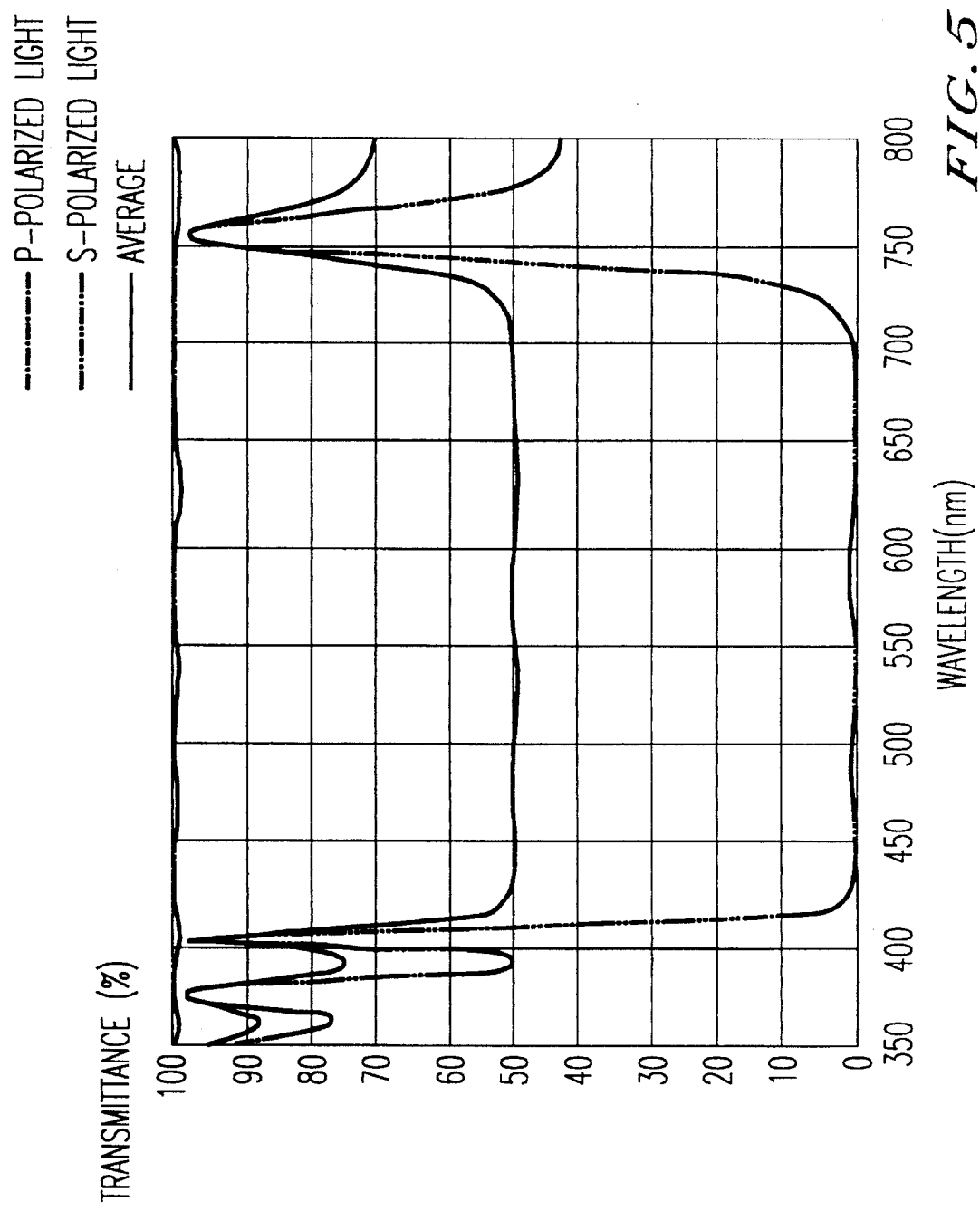
FIG. 5 is a descriptive drawing of a half mirror according to the embodiment of the present invention.

Spectral transmission characteristics of the half mirror 2 are shown in FIG. 5. That is, the half mirror 2 transmits approximately 100 percent of p-polarized light and reflects approximately 100 percent of s-polarized light in the range of visible light of wavelengths 450 to 700 nm.

Accordingly, since 50 percent of light which has passed through the objective lens 1 reaches the eyepiece 3 and 50 percent of light entering the liquid frame 4 reaches the eyepiece 3, a frame image can be made bright and clear without darkening a visual field image of the finder.

Figure 1A:
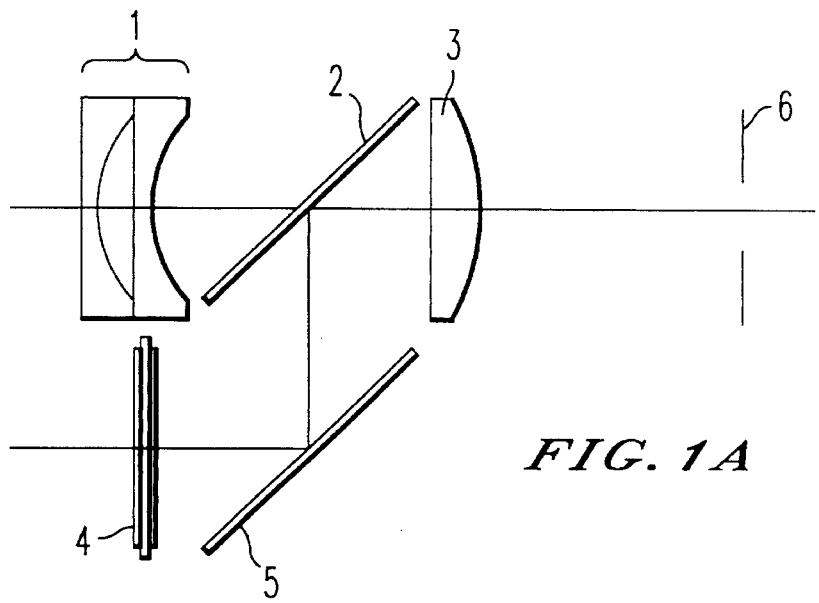
FIGS. 1(a) to 1(c) are each a descriptive drawing of an illuminating window type bright frame finder according to the present invention.
Figure 1B:
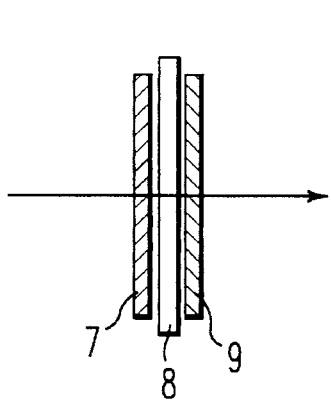
Figure 1C:
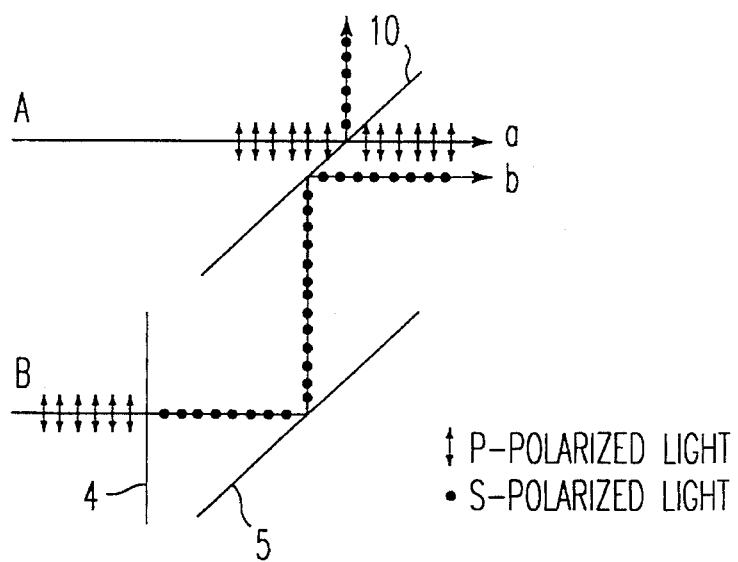
Figure 3:
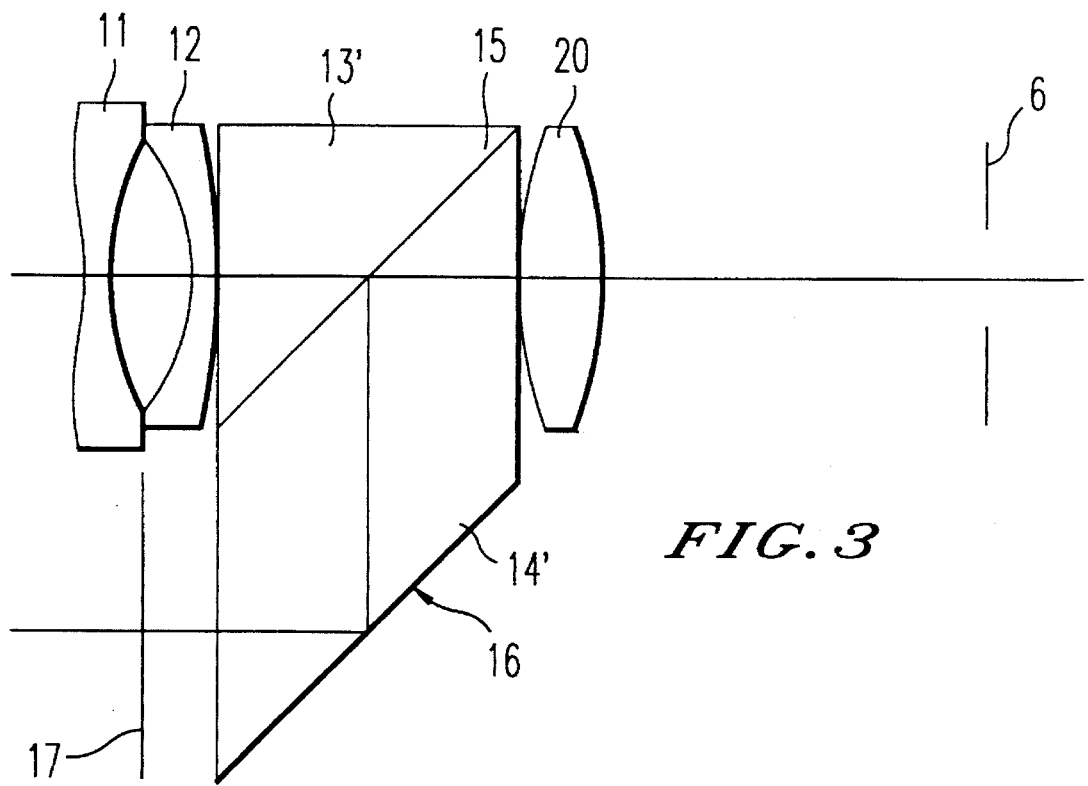
FIG. 3 shows another optical arrangement of the illuminating window type bright frame finder according to the present invention.

The liquid frame 4 is not limited to that shown in FIG. 2. It can be also used in the optical arrangements shown in FIGS. 1(a) and 3. In addition, if one of prisms united to each other is made parallelogram-shaped, the half mirror can be used in the optical arrangement shown in FIG. 3.

In the above embodiment, a description was given of a case in which, according to a photographing distance, the frame shape and frame position of the liquid crystal frame are changed. The present invention is also applicable to a camera in which standard and panoramic image sizes can be optionally and alternately changed between the two image sizes. FIGS. 6(a) to 6(b-2) show an embodiment in which an alternate change between the standard and panoramic image sizes is carried out in the field image of the finder.

As shown in FIG. 6(b-1), transparent electrodes 80a to 80h are formed on one side of the liquid crystal layer 8. On the other side thereof, a transparent electrode common to the transparent electrodes 80a to 80h is formed.

FIG. 6(a) is a block diagram showing a means for changing a field image of the finder in accordance with the changing of a photographic image size of the liquid crystal frame. When a changing switch 47 for changing the photographing image size is turned on, an aperture size of a film surface is mechanically changed. When turned on, the CPU 40 causes a date module 48 to change a date-indicating-position. At the same time, the CPU 40 causes a liquid crystal driver 41 to change a finder frame. That is, when the standard image size is selected for the photographic image size, voltage is applied between the common transparent electrode and the transparent electrodes 80a, 80b, 80c, and 80d, as shown in FIG. 6(b-1). Thereby, a field image of the finder according to the standard image size with the largest shape of frame is obtained. When the panoramic image size is selected for the photographic image size, voltage is applied between the common transparent electrode and the transparent electrodes 80e, 80f, 80g, and 80h, as shown in FIG. 6(b-2). Thereby, a field image of the finder according to the panoramic image size is obtained.

Of course, it is possible to adopt an arrangement in which the changing of a frame based on a photographing distance and the changing of a frame based on a photographic image size are selectively carried out by forming the transparent electrodes 8a to 8n shown in FIG. 4(b-1) on the liquid crystal layer which has the transparent electrodes 80a to 80h shown in FIG. 6(b-1).

According to the present invention, since the illuminating window type bright frame finder is constructed as mentioned above, a frame image can be easily viewed without darkening a visual field image of the finder. In other words, it is possible to provide an illuminating window type bright frame finder in which both a visual field image and a frame image are bright. In addition, the finder can be made smaller because junction prisms, instead of the half mirror, united to each other with the half mirror layer between enables an optical distance to be substantially lengthened by the refractive index of the prisms.

What is claimed is:

1. An illuminating window type bright frame finder comprising:

an objective lens with a negative focal length;

an eyepiece with a positive focal length;

a liquid crystal frame;

a half mirror; a mirror and means for controlling said liquid crystal frame;

an optical path from said liquid crystal frame to said eyepiece via said mirror and said half mirror being formed by placing said half mirror between said objective lens and said eyepiece, so that a visual field image superimposed upon a frame image through only said eyepiece can be viewed;

wherein said half mirror has polarization characteristics in which an average reflectance $R_p$ with respect to p-polarized light is $R_p < 0.35$ and an average reflectance $R_s$ with respect to s-polarized light is $R_s > 0.65$ on the condition that an incident angle of light upon said half mirror is 45° and a wavelength of the light belongs to a visible light range, and said liquid crystal frame is arranged such that light which has passed through said liquid crystal frame becomes s-polarized light when the light is made incident upon said half mirror.

2. An illuminating window type bright frame finder according to claim 1, wherein said half mirror is a half mirror layer deposited on a transparent parallel plate.

3. An illuminating window type bright frame finder according to claim 1, wherein said half mirror is a junction prism in which prisms are united to each other with a half mirror layer between.

4. An illuminating window type bright frame finder according to claim 3, wherein said mirror is a prism surface parallel to said half mirror layer of said junction prism.

* * * * *